Sept. 7, 1948.   J. G. INGRES   2,448,981
BOOSTER BRAKE MECHANISM
Filed April 25, 1945   2 Sheets-Sheet 1
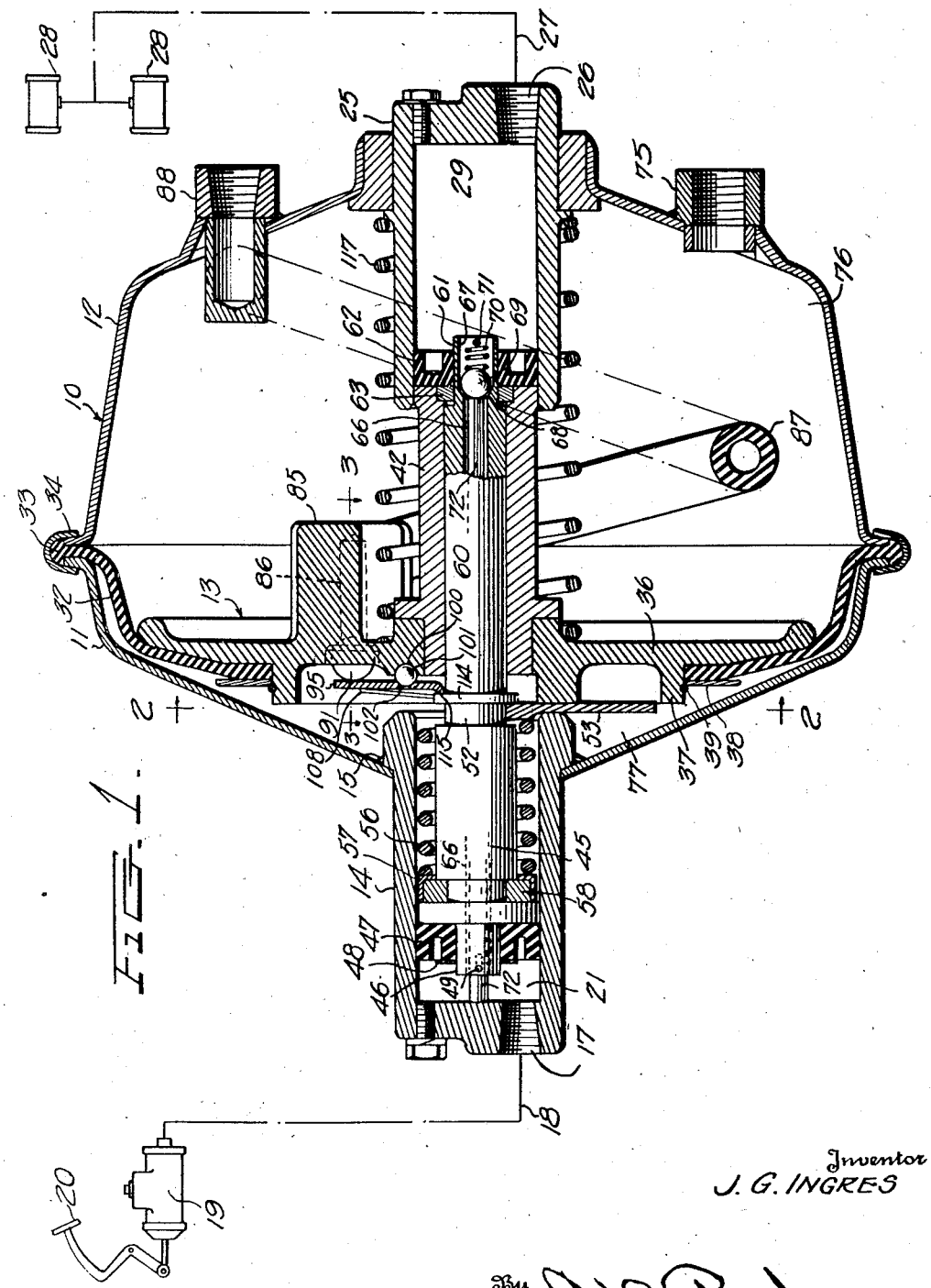
Inventor
J. G. INGRES Sept. 7, 1948. J. G. INGRES 2,448,981
BOOSTER BRAKE MECHANISM
Filed April 25, 1945 2 Sheets-Sheet 2
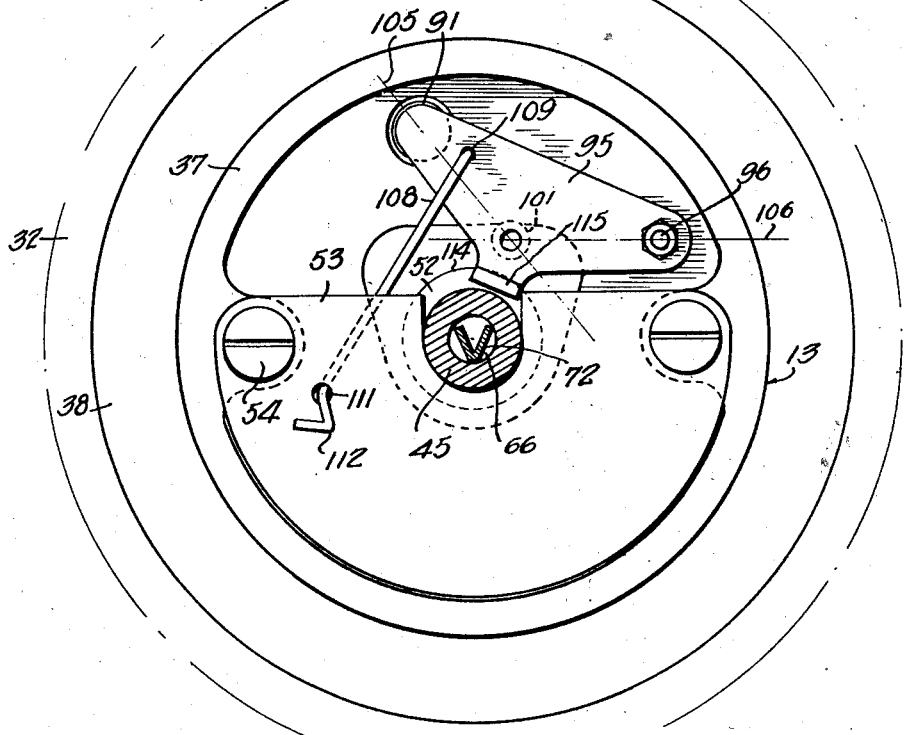
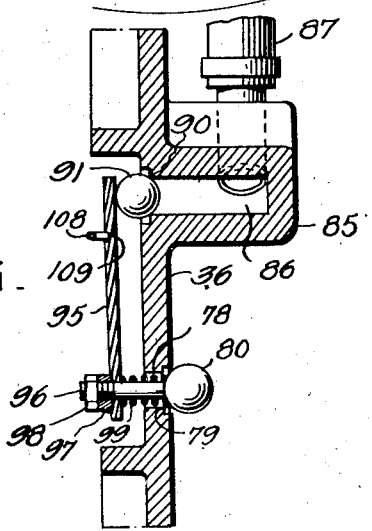
Inventor
J. G. INGRES
By C. L. Parker
Attorney Patented Sept. 7, 1948

2,448,981

UNITED STATES PATENT OFFICE 2,448,981

BOOSTER BRAKE MECHANISM

Jeannot G. Ingres, Richmond, Va., assignor to Empire Electric Brake Company, Newark, N. J., a corporation of New Jersey Application April 25, 1945, Serial No. 590,233

12 Claims. (Cl. 121—41)

This invention relates to hydraulic booster brake mechanisms and more particularly a fluid pressure operated motor for use with such mechanisms.

Several types of booster brake mechanisms have been developed wherein the displacement of fluid from a vehicle master cylinder is utilized for operating a valve mechanism to energize a fluid pressure operated motor which acts to generate or assist in generating the desired braking pressures in the brake cylinder. Such devices ordinarily utilize the displacement of fluid from the master cylinder to move a piston projecting into the high pressure cylinder of the booster to perform part of the work of generating the braking pressures.

In the interests of simplicity, compactness, etc., valve mechanisms for apparatus of the character referred to have employed levers operable by fluid displaced from the master cylinder to effect operation of valves carried by the fluid pressure responsive units of the motors. Such levers have been found highly effective in use, particularly where it is possible to multiply valve movement in proportion to the rate of displacement of fluid from the master cylinder, thereby effecting a rapid degree of response of the fluid pressure operated motor to movement of the brake pedal.

An important object of the present invention is to provide an improved mechanism of the character referred to wherein an extremely simple type of valve operating lever is provided and wherein movement of the control valves is multiplied with respect to movement of the plunger which is subject to operation by fluid displaced from the master cylinder.

A further object is to provide such a device wherein both of the valves are arranged generally to one side of the axis of the motor, thus permitting the use of a simplified lever which need not straddle the axial plunger elements of the apparatus, and to provide an arrangement of parts wherein through the use of changing axes of rocking movement of the lever, very rapid response of the valves to operation of the brake pedal is provided.

A further object is to provide a mechanism of the character just referred to wherein the valve operating lever pivots on one axis to operate a valve, and then pivots on a second axis to operate the other valve, the rocking axes of the lever intersecting and the lever being provided at such intersecting point with a ball support which serves to assist in fulcruming the lever on either of its rocking axes.

Other objects and advantages of the invention will become apparent during the course of the following description.

In the drawings I have shown one embodiment of the invention. In this showing:

Figure 1 is an axial sectional view through the booster unit, the master cylinder and wheel cylinders and the connection of such mechanisms with the booster units being diagrammatically represented, Figure 2 is an enlarged detail sectional view on line 2—2 of Figure 1, the motor casing being omitted, and, Figure 3 is an enlarged fragmentary sectional view on line 3—3 of Figure 1.

Referring to Figure 1, the numeral 10 designates the motor of the booster unit comprising dished casing sections 11 and 12 between which is arranged a pressure responsive unit indicated as a whole by the numeral 13 and referred to in detail later. The casing section 11 carries an axial cylinder 14 which may be welded thereto as at 15, the cylinder 14 projecting a substantial distance beyond the casing section 11 and being tapped as at 17 for connection with a line 18. This line extends from a conventional master cylinder 19 having the usual piston (not shown) therein operable by a brake pedal 20. Depression of the brake pedal displaces fluid from the master cylinder 19 into the end 21 of the cylinder 14, constituting a low pressure chamber, as will be referred to later.

The casing section 12 carries a cylinder indicated as a whole by the numeral 25 arranged in axial alinement with the cylinder 14. The cylinder 25 projects substantially into the interior of the motor and is tapped as at 26 for connection with a line 27 leading to the brake cylinders diagrammatically indicated by the numeral 28. The space 29 within the cylinder 25 constitutes the high pressure chamber of the mechanism in which is generated the pressure for operating the brake cylinders 28.

The pressure responsive unit 13 comprises a diaphragm 32 having a peripheral bead 33 clamped to the motor casing members by a split clamp 34 which also obviously serves to clamp the casing members 11 and 12 relative to each other. The pressure responsive unit 13 further comprises a diaphragm plate 36 having an annular shoulder 37 against which the inner periphery of the diaphragm 32 is arranged, the inner portion of the diaphragm being engaged by a plate 38 held in position by a snap ring 39. The diaphragm plate carries a tubular plunger 42 projecting therefrom and extending into the cylinder 29.

A plunger 45 is arranged in the cylinder 14 and carries an axial extension 46. Between such extension and the wall of the cylinder 14 is arranged a seal 47 held in position by a washer 48 fixed against displacement from the extension 46 by a pin 49. The plunger 45 is provided with an annular groove 52 slightly wider than and receiving the adjacent portion of a stop plate 53 (Figures 1 and 2) secured by screws 54 to the diaphragm plate 36. Obviously, the plunger 45 is movable to the right as viewed in Figure 1 relative to the pressure responsive unit of the motor only to the extent of the play between the plate 53 and the left hand side of the groove 52. Such side of the groove 52 will engage the plate 53 to effect movement of the plate 36 and plunger 32 in the event of a failure of power in the apparatus, as will be apparent. A compression spring 56 has one end seating against the plate 53 and its other end against a spring seat 57 engaging a ring 58 carried by the plunger 45.

The plunger 45 is provided with an extended portion 60 extending through the tubular plunger 44. The right hand end of the extension 60 in Figure 1 is reduced as at 61, and a seal 62 is arranged between the reduced portion 61 and the inner wall of the cylinder 25, the seal 62 engaging the plunger 42 and, engaging a ring 63 surrounding the inner end of the reduced portion 61.

The plunger 45 is provided throughout its length with an axial bore 66, the right hand end of which is enlarged as at 67 to form a valve seat 68 engageable by a ball valve 69. This ball is urged toward its seat by a spring 70 operating against a pin 71. A rod 72, which may be made of flat material bent into V shape, as shown in Figure 2, extends through the axial passage 66. One end of the rod 72 engages the end of the cylinder 14 to hold the ball 69 off its seat when the parts of the apparatus are in the "off" position shown in Figure 1.

In its present embodiment, the motor is preferably of the "vacuum suspended" type and the casing section 12 is provided with a suitable fitting 75 by means of which the chamber 76 within the casing section 12 may be permanently connected to the intake manifold of the vehicle engine or other source of pressure. The other chamber 77 of the motor normally communicates with the chamber 76 through a port 78 (Figure 3) extending through the diaphragm plate 36. This port has a seat 79 engageable by a ball valve 80 to be closed thereby under the proper operating conditions.

The diaphragm plate carries a boss 85 having a chamber 86 therein communicating with one end of a flexible hose 87, the opposite end of which leads to a suitable connection 88 extending through the housing section 12. The fitting 88 may directly communicate with the atmosphere, but preferably communicates with the atmosphere through a suitable air cleaner (not shown). The chamber 86 (Figure 3) has a valve seat 90 engageable by a ball valve 91 which is normally seated to disconnect the motor chamber 77 from the atmosphere or other source of pressure higher than that maintained in the motor chamber 76.

The valves 80 and 91 are controlled and operated by a lever 95 which is substantially triangular in shape as clearly shown in Figure 2. For a purpose to be described, this lever is angularly arranged so that the left hand end of the lever, as viewed in Figure 2, is substantially above the corresponding side of the plate 53. The ball valve 80 (Figure 3) carries a stem 96 extending through the adjacent end of the lever 95 and an adjusting nut 97 is threaded on the stem 96 and backed up by a jamb nut 98. A small coil spring 99 preferably surrounds the stem 96 between the lever 95 and ball 80. The other end of the lever directly engages the ball 91, as shown in Figure 3.

As shown in Figure 1, the diaphragm plate 36 is provided with a substantially hemispherical recess 100 in which is arranged a ball 101 engageable in a similar but somewhat shallower recess 102 formed in the plate 95. As will be further referred to below, movement of the plunger 45 toward the right, (Figure 1) first swings the right end of the lever 95 (Figure 2) to close the valve 80, and such operation takes places with the lever 95 rocking on the axis indicated by the broken line 105 in Figure 2, the plate 95 bearing on the ball 101 and valve 91. Such rocking movement of the lever 95 is limited to the point where the valve 80 (Figure 3) closes. Thereafter, the plate will rock on the axis indicated by the broken line 106 in Figure 2, the lever under such conditions rocking on the nut 97 and ball 100. The correct sequence of operations of the lever as described is determined by the use of a suitable spring resisting movement of the end of the lever engaging the valve 91. Referring to Figures 1 and 2, it will be noted that a wire spring 108 has one end engaging the lever 95, the latter preferably being provided with a small recess 109 into which the end of the spring 108 is turned. The spring extends back of the plate 53, as viewed in Figure 2, thence through an opening 111 in such plate, and the lower end of this spring is suitably bent at as 112 to prevent its slipping through the opening 111. The spring 108 urges the end of the lever which it engages inwardly against the ball valve 91.

The right hand extremity of the groove 52, as viewed in Figure 1, is formed by an annular flange 114, and this flange engages the radially inner end 115 of the lever 95, such end of the lever being turned into engagement with the flange 114. The flange 114, when the parts are in the "off" position shown, fully releases the lever 95 and the spring 108 seats the air valve 91 against atmospheric pressure.

As will be referred to later, a return spring 117 is employed to return all of the parts to normal position, assisted by the spring 56. This spring functions after the power-operated parts reach normal position to effect final movement of the plunger 45 and associated parts to their "off" position.

The operation of the device is as follows:

The parts normally occupy the positions shown in Figure 1, as stated above, and when the brakes are to be applied, the operator presses downwardly on the brake pedal 20 in the usual manner. Fluid displaced from the master cylinder flows into the chamber 21, thence through the annular passage 66, the ball 69 being held unseated by the rod 72. Fluid flows from the chamber 29 through brake lines 27 into the brake cylinders to quickly move the brake shoes into engagement with the drums, the brake slack thus being taken up without any movement of the plungers 42 and 45.

As soon as the brake shoes contact the drums, their further movement will be substantially resisted, thus causing a sudden increase in the fluid pressure in the system. The cross-sectional area of the chamber 21 being greater than the area of the plunger extension 61 exposed to pressure in the chamber 29, the plunger 45 will move to the right, as viewed in Figure 1. This movement is transmitted to the radially inner end of the lever 95 to tend to move the radially outer end of the lever toward the left, as viewed in Figure 1. Such movement will be resisted by the spring 108, and the air valve end of the lever 95 will be held in engagement with the ball valve 91, and the lever will rock on the axis 105 (Figure 2) formed by the balls 91 and 101. The end of the lever associated with the vacuum valve 80 (Figure 3) will be moved, and the lever engaging the nut 97 will immediately seat the valve 80 to close communication between the motor chambers 76 and 77 (Figure 1).

Particular attention is invited to the fact that since the movement of the lever 95 referred to will be a rocking movement on the axis 105 (Figure 2) the lever arm between this axis and the stem 96 will be substantially longer than the lever arm between the axis 105 and the lever end 115 (Figure 1). Movement of the lever to seat the valve 80 thus will be greatly multiplied relative to movement of the plunger 45 to provide for a substantially instantaneous seating of the vacuum valve 80. The seating of this valve requires extremely slight movement of the plunger 45. As soon as the valve 80 is seated, further turning movement of the lever plate 95 on the axis 105 will be prevented. Thereafter, the lever 95 will turn on the axis 106 (Figure 2), the lever seating on the ball 101 and on the nut 97 (Figure 3), contact of the lever with the nut 97 being maintained by virtue of the pressure of the spring 108. Turning movement of the lever 95 on the axis 106 relieves the pressure of the lever against the air valve 91 (Figure 3) and this valve will be moved from its seat by atmospheric pressure in the chamber 86. Attention also is particularly invited to the fact that the same multiplication of the lever lengths occurs with the opening of the air valve 91 as with the closing of the vacuum valve 80, the lever arm between the axis 106 and valve 90 being substantially greater than the inner lever arm through which motion is transmitted to the lever 95. The movement of the lever 95 to release the air valve 91 therefore takes place very rapidly with extremely slight movement of the plunger 45, and such movement of the lever 95 takes place against the resistance of the spring 108.

The admission of air into the motor chamber 77 upon the unseating of the air valve 91 establishes higher pressure in the chamber 77 than in the chamber 76, and movement of the pressure responsive unit 13 will be effected. This movement is transmitted through sleeve 42 and ring 63 (Figure 1) to the seal 62 to move the latter, as a plunger into the high pressure chamber 29. This movement, of course, takes place simultaneously with movement of the plunger end 61. The operator thereby performs part of the work in building up the braking pressures in the chamber 29 to apply the brakes. It will be understood that promptly upon movement of the plunger 45 (Figure 1) toward the right, the rod 72 will release the ball 69 for movement toward its seat, and the entire area of the plunger end 61 thereupon becomes effective for assisting in building up pressure in the chamber 29. Reaction on the brake pedal 20 obviously occurs through the resistance encountered by the plunger end 61 in building up pressure in the chamber 29, and the "feel" in the brake pedal will be proportionate to the braking pressures in the chamber 29.

As soon as the braking pressure has been built up to the desired point, movement of the brake pedal 20 will be stopped. No further movement of the plunger 45 will then take place and an extremely slight additional movement of the pressure responsive unit 13 will result in relieving the pressure of the flange 114 against the lever end 115, whereupon the spring 108 will seat the air valve 91 to prevent the further admission of air into the motor chamber 77. Theoretically, contact will be maintained between the flange 114 and the lever end 115 to hold the vacuum valve 80 closed. Any tendency for the differential pressures of the motor chambers 76 and 77 to carry the pressure responsive unit beyond a point corresponding to the position of the plunger 45 will further relieve pressure between the flange 114 and the lever end 115, whereupon the vacuum valve 80 will be "cracked" due to the higher pressure in the motor chamber 77, and the differential pressure tending to move the pressure responsive unit 13 will be reduced and the unit 13 will become stationary.

The same effective lever lengths which result in the rapid operation of the valves 80 and 91 (Figure 3) to energize the motor 10 are effective for reversing the valve action to arrest movement of the pressure responsive unit 13 when the desired braking pressures are built up, as will be obvious. The valve mechanism provides for an extremely sensitive and accurate follow-up action. The lever 95 and associated elements are greatly simplified over prior structures, the lever being capable of being formed as an extremely simple stamping and the entire lever is arranged to one side of the axis of the plunger 45. It is unnecessary to bridge or straddle the plunger, and the shifting of the turning axes is highly advantageous in lengthening the effective lever lengths for each of the valves 80 and 91, thus providing a motor whose response to operation of the brake pedal is extremely rapid as well as accurate. This is true of both the brake-applying and releasing operations, as will be apparent.

When the brake pedal is released, the spring 108 holds the valve 91 seated against atmospheric pressure, and the releasing of the pressure in the flange 114 against the lever end 115 permits the higher pressure in the motor chamber 77 to unseat the vacuum valve 80, and this operation takes place very rapidly as stated to provide for a rapid balancing of the pressures in the motor chambers 76 and 77. The spring 117 immediately functions to move the pressure responsive unit toward "off" position. The force of the spring is assisted by the return springs of the brake cylinders tending to displace fluid back into the chamber 29. Movement of the pressure responsive unit 13 is transmitted to the plunger 45 and associated elements through engagement of the plate 53 (Figure 1) with the left hand limit of the groove 52, assisted by the spring 56. Movement of the power-operated parts is limited by engagement of the plate 53 with the adjacent end of the cylinder 14, and after such position is reached, the spring 56 will move the plunger 45 and associated elements to their fully "off" position with the flange 114 engaging the plate 53. The last increment of movement of the plunger 45 takes place with the rod 72 engaging the end of the cylinder 14 to unseat the valve 69. This valve will remain off its seat until the next brake operation and upon being unseated, fluid can flow from the chamber 21 into the chamber 29 to replenish any fluid leakage which may have occurred during the braking operation.

I claim:

1. A fluid pressure motor comprising a casing having a pressure responsive unit therein, a pair of valves carried by said unit and operable for controlling pressures in said casing, and a plate mounted for bodily movement with said unit and forming an operating lever for said valves, said plate being mounted to rock successively on two axes in its own plane to successively operate said valves to energize said motor.

2. A fluid pressure motor comprising a casing having a pressure responsive unit therein, a pair of valves carried by said unit and operable for controlling pressures in said casing, a plate mounted for bodily movement with said unit and forming an operating lever for said valves, said plate being mounted to rock successively on two axes in its own plane to successively operate said valves to energize said motor, and resilient means opposing movement of the portion of said plate associated with one valve whereby operation of said plate will first effect movement of the other valve.

3. A fluid pressure motor comprising a casing having a pressure responsive unit therein, a pair of valves carried by said unit and operable for controlling pressures in said casing, a plate mounted for bodily movement with said unit and forming an operating lever for said valves, and a single-point bearing engaging said plate and said unit, said plate having mechanical engagement with said valves at points spaced from each other and from said bearing whereby said plate is rockable on a pair of axes in its own plane intersecting at said bearing to successively operate said valves.

4. A fluid pressure motor comprising a casing having a pressure responsive unit therein, a pair of valves carried by said unit and operable for controlling pressures in said casing, a plate mounted for bodily movement with said unit and forming an operating lever for said valves, a single-point bearing engaging said plate and said unit, said plate having mechanical engagement with said valves at points spaced from each other and from said bearing whereby said plate is rockable on a pair of axes in its own plane intersecting at said bearing to successively operate said valves, and resilient means opposing movement of the portion of said plate associated with one of said valves whereby operation of said plate will first operate the other valve.

5. A fluid pressure motor comprising a casing having a pressure responsive unit therein, a pair of valves carried by said unit and operable for controlling pressures in said casing, a plate mounted for bodily movement with said unit and forming an operating lever for said valves, a single-point bearing engaging said plate and said unit, means spaced from said bearing and engaging said plate to operate it, said plate having portions mechanically engaging said valves at points spaced from each other and from said bearing and said bearing being between said points and said means whereby movement of said plate by said means will tend to operate both valves, and means resiliently resisting operation of one valve upon movement of said plate whereby the latter will first move the other valve.

6. A differential fluid pressure operated motor comprising a casing, a unit in said casing movable by differential pressures in said casing on opposite sides of said unit, a pair of spaced valves carried by said unit, one of said valves being movable to closed position to close communication between opposite sides of said unit and the other valve being movable to open position to connect the chamber at one side of said unit to a source of relatively high pressure, a plate forming an operating lever for said valves, a single-point bearing engaging said plate radially inwardly of said valves, means radially inwardly of said bearing for rocking said plate thereon to tend to move both valves, and resilient means opposing movement of said other valve whereby the first named valve will be closed prior to opening movement of said other valve.

7. A differential fluid pressure operated motor comprising a casing, a unit in said casing movable by differential pressures in said casing on opposite sides of said unit, a pair of spaced valves carried by said unit, one of said valves being movable to closed position to close communication between opposite sides of said unit and the other valve being movable to open position to connect the chamber at one side of said unit to a source of relatively high pressure, a plate forming an operating lever for said valves, a single-point bearing engaging said plate radially inwardly of said valves, an axially movable member projecting into said motor and engageable with said plate radially inwardly of said bearing to rock said plate thereon to tend to move said valves, and a spring device engaging said plate at a point closer to said other valve than to the first named valve whereby movement of said plate will be a rocking movement on an axis predetermined by said bearing and said other valve to close said first named valve, whereupon said plate will rock on a second axis predetermined by said bearing and said first named valve to open said other valve.

8. A differential fluid pressure operated motor comprising a casing, a pressure responsive unit dividing said casing into chambers and movable in accordance with differential pressures therein, said unit being provided with a port connecting said chambers, a pressure-balancing valve controlling said port, a second valve carried by said unit and controlling communication of one of said chambers with a source of relatively high pressure, said valves being spaced from each other, a plate having mechanical engagement with said valves, a single-point bearing engaging said plate radially inwardly of said valves, a spring engaging said plate adjacent said second valve to normally hold the latter seated against said relatively high pressure while said pressure-balancing valve is free to remain open, and means engaging said plate radially inwardly of said bearing to rock said plate thereon.

9. A differential fluid pressure operated motor comprising a casing, a pressure responsive unit dividing said casing into chambers and movable in accordance with differential pressures therein, said unit being provided with a port connecting said chambers, a pressure-balancing valve controlling said port, a second valve carried by said unit and controlling communication of one of said chambers with a source of relatively high pressure, said valves being spaced from each other, a plate having mechanical engagement with said valves, a single-point bearing engaging said plate radially inwardly of said valves, a spring engaging said plate adjacent said second valve to normally hold the latter seated against said relatively high pressure, while said pressure-balancing valve is free to remain open, and a plunger movable axially of said casing and having a shoulder engaging said plate radially inwardly of said bearing to effect movement of said plate.

10. A differential fluid pressure operated motor comprising a casing, a unit in said casing movable by differential pressures in said casing on opposite sides of said unit, a pair of spaced valves carried by said unit, one of said valves being movable to closed position to close communication between opposite sides of said unit, the other valve being movable to open position to connect the chamber at one side of said unit to a source of relatively high pressure, a plate bodily movable with said unit and forming an operating lever for said valves, a single point bearing between and engaging said plate and said unit to one side of the line connecting said valves, spring means movable with said unit and engaging said plate to tend to open said first-named valve and to normally seat said other valve, and movable means engaging said plate and operable for rocking said plate on said bearing to close said first-named valve and then open said other valve.

11. A differential fluid pressure operated motor comprising a casing, a unit in said casing movable by differential pressures in said casing on opposite sides of said unit, a pair of spaced valves carried by said unit, one of said valves being movable to closed position to close communication between opposite sides of said unit, the other valve being movable to open position to connect the chamber at one side of said unit to a source of relatively high pressure, a plate bodily movable with said unit and forming an operating lever for said valves, a single point bearing between and engaging said plate and said unit to one side of the line connecting said valves, spring means movable with said unit and engaging said plate to tend to open said first-named valve and to normally seat said other valve, and movable means engaging said plate and operable for rocking said plate on said bearing to close said first-named valve and then open said other valve, said spring means seating said other valve against the pressure of said source and being arranged closer to said other valve than to said first-named valve to exert a greater force against said other valve than against said first-named valve.

12. A differential fluid pressure operated motor comprising a casing, a unit in said casing movable by differential pressures in said casing on opposite sides of said unit, a pair of spaced valves carried by said unit, one of said valves being movable to closed position to close communication between opposite sides of said unit, the other valve being movable to open position to connect the chamber at one side of said unit to a source of relatively high pressure, a plate bodily movable with said unit and forming an operating lever for said valves, a single point bearing between and engaging said plate and said unit to one side of the line connecting said valves, a spring having one end fixed to said unit and its other end engaging said plate to tend to open said first-named valve and to seat said other valve, and movable means engaging said plate at a point spaced from said bearing at the side thereof opposite said line to rock said plate on said bearing to close said first-named valve and open said other valve, said spring engaging said plate at a point such that greater force will be exerted thereby to tend to seat said other valve than to open said first-named valve.

JEANNOT G. INGRES.

REFERENCES CITED

The following references are of record in the file of this patent:

UNITED STATES PATENTS

| Number | Name | Date |
| --- | --- | --- |
| 2,354,814 | Joesting | Aug. 1, 1944 |
| 2,373,450 | Boldt | Apr. 10, 1945 |
| 2,377,699 | Klimkiewicz | June 5, 1945 |